(12) United States Patent
Liu et al.

(10) Patent No.: US 11,486,355 B2
(45) Date of Patent: Nov. 1, 2022

(54) METHOD FOR OPERATING DOUBLY-FED WIND TURBINE GENERATOR AS A VIRTUAL SYNCHRONOUS MACHINE TO PROVIDE GRID-FORMING CONTROL THEREOF

(71) Applicant: General Electric Company, Schenectady, NY (US)

(72) Inventors: Hanchao Liu, Troy, NY (US); Maozhong Gong, Latham, NY (US); Di Pan, Schenectady, NY (US); Yichao Zhang, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 17/139,329

(22) Filed: Dec. 31, 2020

(65) Prior Publication Data

US 2022/0205424 A1 Jun. 30, 2022

(51) Int. Cl.
*F03D 9/00* (2016.01)
*H02P 9/04* (2006.01)
(Continued)

(52) U.S. Cl.
CPC ......... *F03D 7/0272* (2013.01); *F03D 7/0284* (2013.01); *F03D 9/257* (2017.02);
(Continued)

(58) Field of Classification Search
CPC ...... F03D 7/0272; F03D 9/257; F03D 7/0284; F05B 2220/342; F05B 2220/70646; F05B 2270/337; F05B 2270/1033
See application file for complete search history.

(56) References Cited

U.S. PATENT DOCUMENTS 5,225,712 A * 7/1993 Erdman ................ H02J 3/1842
290/55
5,798,631 A * 8/1998 Spee ........................ F03D 7/046
322/29
(Continued)

FOREIGN PATENT DOCUMENTS

CN 103414209 A 11/2013
CN 106684923 A 5/2017
(Continued)

OTHER PUBLICATIONS

Huang et al., Synchronization and Frequency Regulation of DFIG-Based Wind Turbine Generators with Synchronized Control, IEEE Transactions on Energy Conversion, vol. 32, No. 3, Sep. 2017, pp. 1251-1262. DOI: 10.1109/TEC.2017.2675480. Abstract Only.

(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

A method for operating an asynchronous doubly-fed wind turbine generator connected to a power grid in a grid-forming mode to emulate a virtual synchronous machine. The doubly-fed wind turbine generator includes a line-side converter coupled to a rotor-side converter via a direct current (DC) link. The method includes receiving, via a controller, at least one reference command from an external controller. The method also includes controlling rotor flux of the doubly-fed wind turbine generator using the at least one reference command. Further, the method includes providing power droop control for the doubly-fed wind turbine generator through at least one of rotor-side reference frame rotation and d-axis flux control.

19 Claims, 11 Drawing Sheets

(51) Int. Cl.
*F03D 7/02* (2006.01)
*F03D 9/25* (2016.01)

(52) U.S. Cl.
CPC ............ *F05B 2220/70646* (2013.01); *F05B 2270/1071* (2013.01); *F05B 2270/337* (2013.01); *F05B 2270/342* (2020.08)

(56) References Cited

U.S. PATENT DOCUMENTS

| | | | | |
|---|---|---|---|---|
| 6,420,795 | B1* | 7/2002 | Mikhail | H02P 9/007 |
| | | | | 290/55 |
| 6,448,735 | B1 | 9/2002 | Gokhale et al. | |
| 7,715,950 | B2* | 5/2010 | Lasseter | H02P 9/04 |
| | | | | 701/99 |
| 8,860,236 | B2* | 10/2014 | Nasiri | H02P 9/04 |
| | | | | 290/55 |
| 9,450,415 | B2* | 9/2016 | Larsen | H02P 9/007 |
| 10,749,446 | B2* | 8/2020 | Gong | H02J 3/38 |
| 10,985,567 | B1* | 4/2021 | Vergara | H02J 7/35 |
| 11,177,660 | B2* | 11/2021 | Ramamurthy | H02M 1/325 |
| 11,231,014 | B2* | 1/2022 | Larsen | F03D 9/257 |
| 2006/0192390 | A1* | 8/2006 | Juanarena Saragueta | |
| | | | | H02P 6/005 |
| | | | | 290/44 |
| 2008/0150285 | A1 | 6/2008 | Corcelles Pereira et al. | |
| 2008/0215187 | A1* | 9/2008 | Lasseter | H02P 9/04 |
| | | | | 700/282 |
| 2009/0121483 | A1* | 5/2009 | Xiong | H02P 9/007 |
| | | | | 290/44 |
| 2009/0200803 | A1* | 8/2009 | Ichinose | H02P 9/10 |
| | | | | 290/44 |
| 2011/0089693 | A1* | 4/2011 | Nasiri | F03D 7/0272 |
| | | | | 290/44 |
| 2013/0027994 | A1* | 1/2013 | Nelson | H02J 3/241 |
| | | | | 363/40 |
| 2013/0234435 | A1* | 9/2013 | Wagoner | H02P 9/007 |
| | | | | 290/44 |
| 2014/0062424 | A1* | 3/2014 | Larsen | H02P 9/007 |
| | | | | 322/24 |
| 2015/0077067 | A1 | 3/2015 | Kanjiya et al. | |
| 2015/0123475 | A1* | 5/2015 | Premm | H02J 3/46 |
| | | | | 307/24 |
| 2018/0328342 | A1 | 11/2018 | Ren et al. | |
| 2019/0157876 | A1* | 5/2019 | Dobrowolski | H02J 3/32 |
| 2020/0014306 | A1* | 1/2020 | Riar | H02M 3/33584 |
| 2020/0212823 | A1* | 7/2020 | Gong | H02J 3/381 |
| 2020/0295671 | A1* | 9/2020 | Huynh | H02J 3/381 |
| 2021/0033069 | A1* | 2/2021 | Lindholm | B64C 39/022 |
| 2021/0047997 | A1* | 2/2021 | Abeyasekera | H02J 3/36 |

FOREIGN PATENT DOCUMENTS

| | | |
|---|---|---|
| CN | 106786810 A | 5/2017 |
| EP | 3339638 A1 | 6/2018 |

OTHER PUBLICATIONS

Nian et al., Improved Virtual Synchronous Generator Control of DFIG to Ride-Through Symmetrical Voltage Fault, IEEE Transactions on Energy Conversion, vol. 35, No. 2, Jun. 2020, pp. 672-682. DOI: 10.1109/TEC.2019.2954596. Abstract Only.

Wang et al., On Inertial Dynamics of Virtual Synchronous-Controlled DFIG-Based Wind Turbines, IEEE Transactions on Energy Conversion, vol. 30, No. 4, Dec. 2015, pp. 1691-1702.

Wang et al., Virtual Synchronous Control for Grid-Connected DFIG-based Wind Turbines, IEEE Journal of Engineering and Selected Topics in Power Electronics, vol. 3, Issue 4, Dec. 2015, pp. 932-944. DOI: 10.1109/JETPE.2015.2418200. Abstract Only.

Extended European Search Report for EP application No. 21214810.0, dated May 13, 2022.

Han, Yongsu et al., Droop Control Using Impedance of Grid-Integrated DFIG within Microgrid, IEEE Transactions on Energy Conversion, IEEE Service Center, Piscataway NJ, US, vol. 34, No. 1, Mar. 1, 2019, pp. 88-97.

* cited by examiner

METHOD FOR OPERATING DOUBLY-FED WIND TURBINE GENERATOR AS A VIRTUAL SYNCHRONOUS MACHINE TO PROVIDE GRID-FORMING CONTROL THEREOF

FIELD

The present disclosure relates generally to inverter-based resources, such as wind turbine power systems and more particularly, to systems and methods for operating grid-connected doubly-fed wind turbine generators as virtual synchronous machines to provide grid-forming control thereof.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

In addition, the reduction in the proportion of synchronous machines with respect to asynchronous machines, which determine the grid defining parameters voltage and frequency, have contributed to decreasing stability margins. The immediate consequence of the decreased stability margins is a grid collapse when subjected to voltage and frequency disturbances in the grid.

Accordingly, many existing asynchronous machines, such as doubly-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following doubly-fed wind turbine generator. As shown, the active power reference to the converter is developed by the energy source regulator, e.g. the turbine control portion of a wind turbine. This is conveyed as a torque reference which represents the lesser of the maximum attainable power from the energy source at that instant, or a curtailment command from a higher-level grid controller. The converter control then determines a current reference for the active component of current to achieve the desired torque. Accordingly, the doubly-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming type converters provide a voltage-source characteristic, where the angle and magnitude of the voltage are controlled to achieve the regulation functions needed by the grid. With this structure, current will flow according to the demands of the grid while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Double-Feb Wind Turbine Generator."

As an example, FIG. 2 illustrates a schematic diagram of one embodiment of a main circuit of a grid-forming system. As shown, the main circuit includes a power-electronic converter with connections on DC and AC sides. This converter receives gating commands from a controller that creates an AC voltage phasor Vcnv at an angle of Thvcnv. The angle is with respect to a reference phasor having a fixed frequency. The DC side is supplied with a device capable of generating or absorbing power for even a short duration. Such devices may include, for example, batteries, solar panels, rotating machines with a rectifier, or capacitors. In addition, as shown, the circuit includes an inductive impedance Xcnv connecting the converter to its point of interconnection, shown as the voltage Vt and angle ThVt in FIG. 2. The electrical system behind the point of interconnect is shown as a Thevenin equivalent with impedance Zthev and voltage Vthev at angle ThVthev. This equivalent can be used to represent any circuit, including grid-connected and islanded circuits with loads. In practical situations, the impedance Zthev will be primarily inductive.

Still referring to FIG. 2, the closed-loop portion of the main control receives feedback signals from the voltage and current at the point of interconnection. Additional inputs are received from higher-level controls (not shown). While FIG. 2 illustrates a single converter as an example, any grouping of equipment that can create an electrical equivalent of a controlled voltage Vcnv behind an impedance Xcnv can have the control schemes disclosed applied to achieve the same performance benefits.

Referring now to FIG. 3, a control diagram for providing grid-forming control according to conventional construction is illustrated. As shown, a converter controller 1 receives references (e.g. Vref and Pref) and limits (e.g. VcmdLimits and PcmdLimits) from higher-level controls 2. These high-level limits are on physical quantities of voltage, current, and power. The main regulators include a fast voltage regulator 3 and a slow power regulator 4. These regulators 3, 4 have final limits applied to the converter control commands for voltage magnitude (e.g. VcnvCmd) and angle (e.g. $\theta_{Pang}$ and $\theta_{PLL}$) to implement constraints on reactive- and real-components of current, respectively. Further, such limits are based upon a pre-determined fixed value as a default, with closed-loop control to reduce the limits should current exceed limits.

Accordingly, the present disclosure is directed to systems and methods for operating grid-connected inverter-based resources having an asynchronous machine as a virtual synchronous machine to provide grid-forming control of the inverter-based resource so as to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for operating an asynchronous doubly-fed wind turbine generator connected to a power grid in a grid-forming mode to emulate a virtual synchronous machine. The doubly-fed wind turbine generator includes a line-side converter coupled to a rotor-side converter via a direct current (DC) link. The method includes receiving, via a controller, at least one reference command from an external controller. The method also includes controlling rotor flux of the doubly-fed wind turbine generator using the at least one reference command. Further, the method includes providing power droop control for the doubly-fed wind turbine generator through at least one of rotor-side reference frame rotation and d-axis flux control.

In an embodiment, the reference command may include a power reference command and/or a voltage reference command from the external controller. In such embodiments, the power reference command may include an active power reference command or a reactive power reference command.

In another embodiment, controlling the rotor flux of the doubly-fed wind turbine generator using the reference command(s) may include receiving the voltage reference command from the external controller, receiving a stator voltage from a stator of the doubly-fed wind turbine generator, determining a flux command using the voltage reference command and the stator voltage, and determining a rotor current command based on the flux command.

In further embodiments, determining the rotor current command based on the flux command may include determining an air gap flux feedback signal using at least one of stator current, the stator voltage, rotor current, or rotor voltage and determining the rotor current command based on the flux command and the air gap flux feedback signal.

In additional embodiments, the method may include determining the rotor current command based on the flux command, the air gap flux feedback signal, and the stator current.

In several embodiments, providing the power droop control for the doubly-fed wind turbine generator through at least one of rotor-side reference frame rotation and d-axis flux control may include providing active power-frequency droop control for the doubly-fed wind turbine generator through rotor-side reference frame rotation and providing reactive power-voltage droop control for the doubly-fed wind turbine generator through d-axis flux control.

In such embodiments, providing the active power-frequency droop control for the doubly-fed wind turbine generator through the rotor-side reference frame rotation may include receiving the active power reference command from the external controller, receiving an active power feedback signal, determining an angular frequency of the doubly-fed wind turbine generator as a function of the active power reference command and the active power feedback signal, determining a rotor frequency using the angular frequency and a magnetizing angular frequency of the doubly-fed wind turbine generator, determining a phase angle for a rotor-side d-q reference frame as a function of the rotor frequency, and shifting the rotor-side d-q reference frame of the doubly-fed wind turbine generator by the phase angle to achieve the active power-frequency droop control of the doubly-fed wind turbine generator.

In particular embodiments, determining the phase angle for the rotor-side d-q reference frame as a function of the rotor frequency may include integrating the rotor frequency to determine the phase angle.

In still another embodiment, providing the power droop control for the doubly-fed wind turbine generator through at least one of rotor-side reference frame rotation and d-axis flux control may include providing a droop characteristic function relating active power values to angular frequency values and determining the angular frequency of the doubly-fed wind turbine generator as a function of the power reference command, the power feedback signal, and the droop characteristic function.

In further embodiments, providing the reactive power-voltage droop control for the doubly-fed wind turbine generator through the d-axis flux control may include receiving the reactive power reference command from the external controller, receiving a reactive power feedback signal, determining a voltage command for the doubly-fed wind turbine generator as a function of one or more of the reactive power reference command, the reactive power feedback signal, and a magnetizing voltage of the doubly-fed wind turbine generator, and controlling d-axis flux of the doubly-fed wind turbine generator using the voltage command.

In certain embodiments, the method may include integrating the voltage command for the doubly-fed wind turbine generator.

In yet another embodiment, the method may include providing a droop characteristic function relating reactive power values to voltage values and determining the voltage command of the doubly-fed wind turbine generator as a function of the reactive power reference command, the reactive power feedback signal, and the droop characteristic function.

In additional embodiments, the controller may include a turbine controller or a converter controller of the wind turbine power system.

In another aspect, the present disclosure is directed to a system for operating an asynchronous doubly-fed wind turbine generator connected to a power grid in a grid-forming mode to emulate a virtual synchronous machine. The doubly-fed wind turbine generator includes a line-side converter coupled to a rotor-side converter via a direct current (DC) link. The system includes a controller having at least one processor configured to perform a plurality of operations, including but not limited to receiving at least one reference command from an external controller, controlling rotor flux of the doubly-fed wind turbine generator using the at least one reference command, and providing power droop control for the doubly-fed wind turbine generator through at least one of rotor-side reference frame rotation and d-axis flux control. It should be understood that the system may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
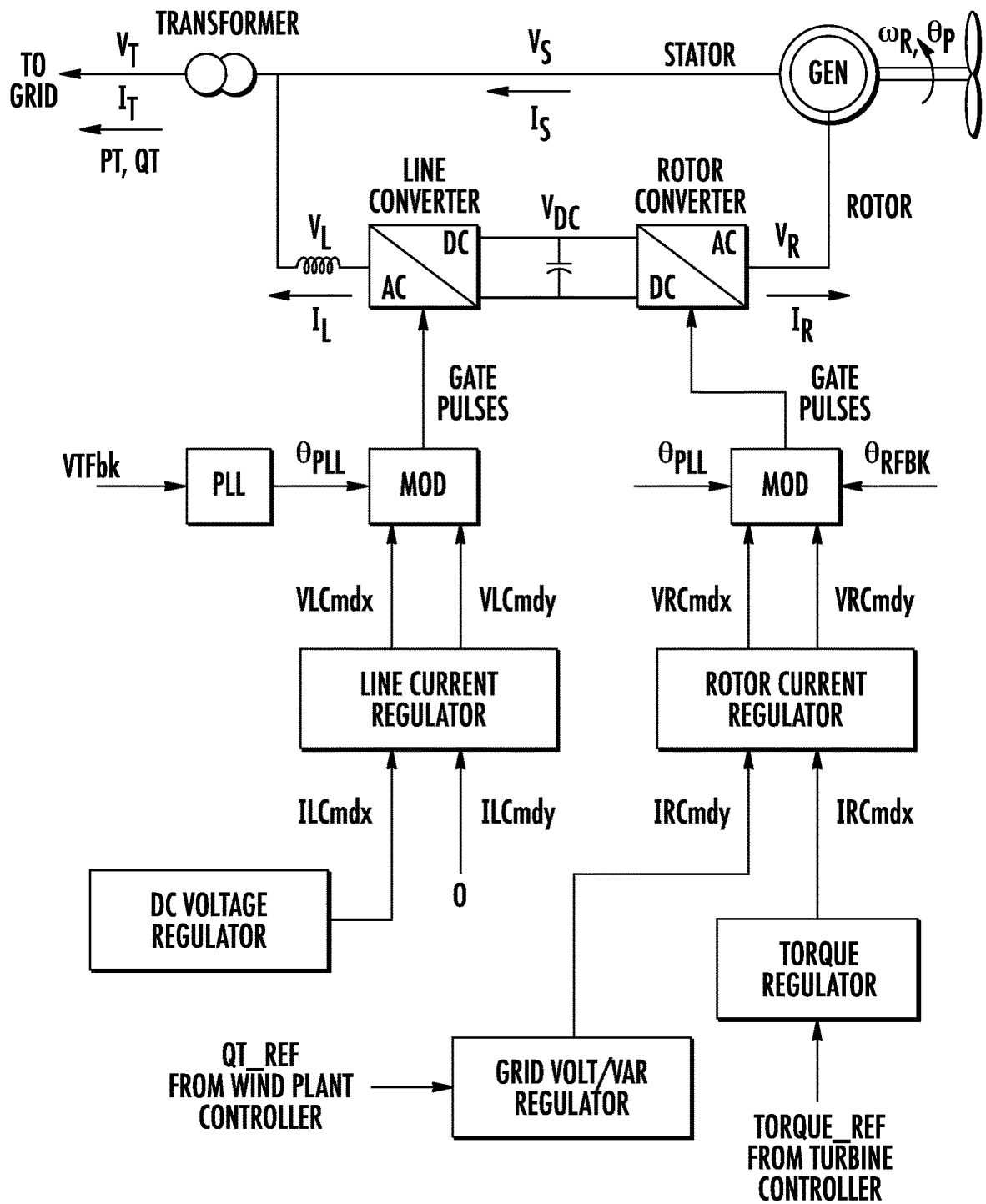
FIG. 1 illustrates a one-line diagram of a doubly-fed wind turbine generator with structure of converter controls for grid-following application according to conventional construction.
Figure 2:
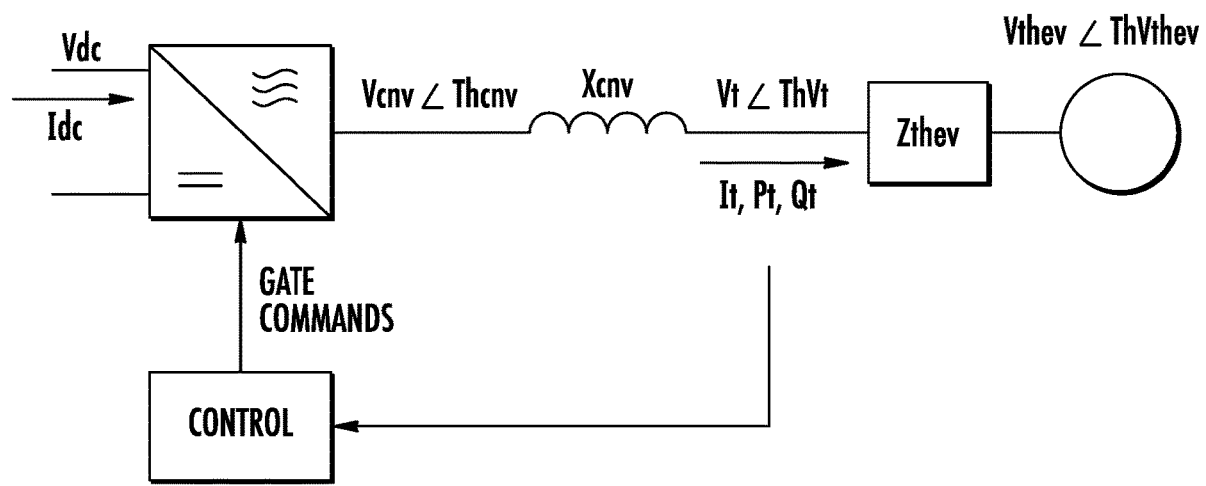
FIG. 2 illustrates a schematic diagram of one embodiment of a main circuit of a grid-forming system according to conventional construction.
Figure 3:
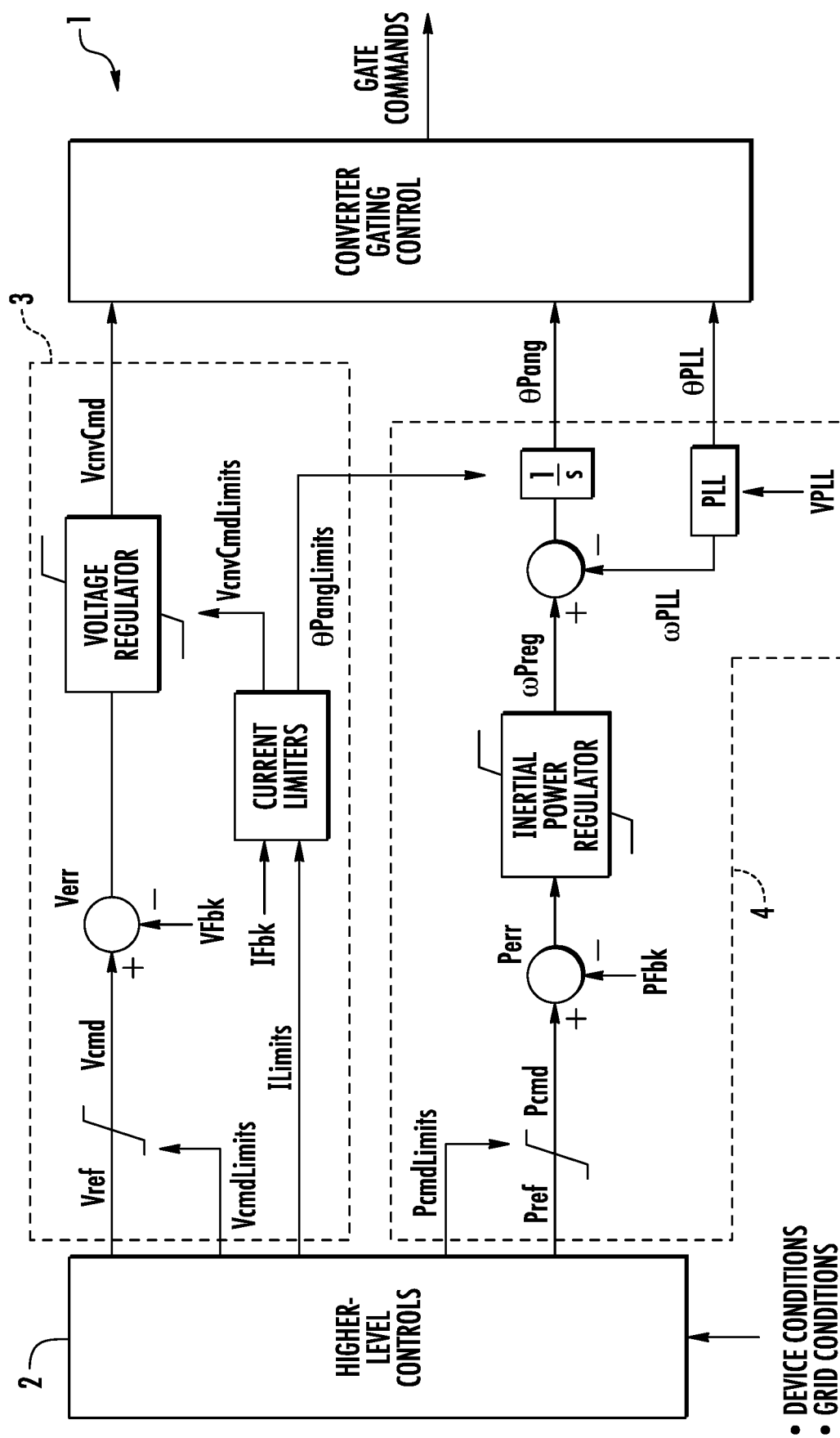
FIG. 3 illustrates a control diagram for providing grid-forming control according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for operating grid-connected doubly-fed wind turbine generators as virtual synchronous machines to provide grid-forming control thereof. Thus, the rotor-side converter control can be modified to emulate the asynchronous machine as a synchronous machine. In particular, the control strategy of the rotor-side converter can be changed from a standalone active and reactive power (P, Q) control to rotor-side converter flux control loop with an embedded rotor current control loop and an active power-frequency droop control through rotor side reference frame rotation and reactive power-voltage droop control through D-axis flux control. Also, Q-axis flux control can participate the flux regulation and in one example, the flux magnitude of the d-q flux vector can be regulated. Accordingly, the present disclosure provides the doubly-fed wind turbine generator with the capability to operate in a grid-forming mode with both islanding and grid-connected operation.

Figure 4:
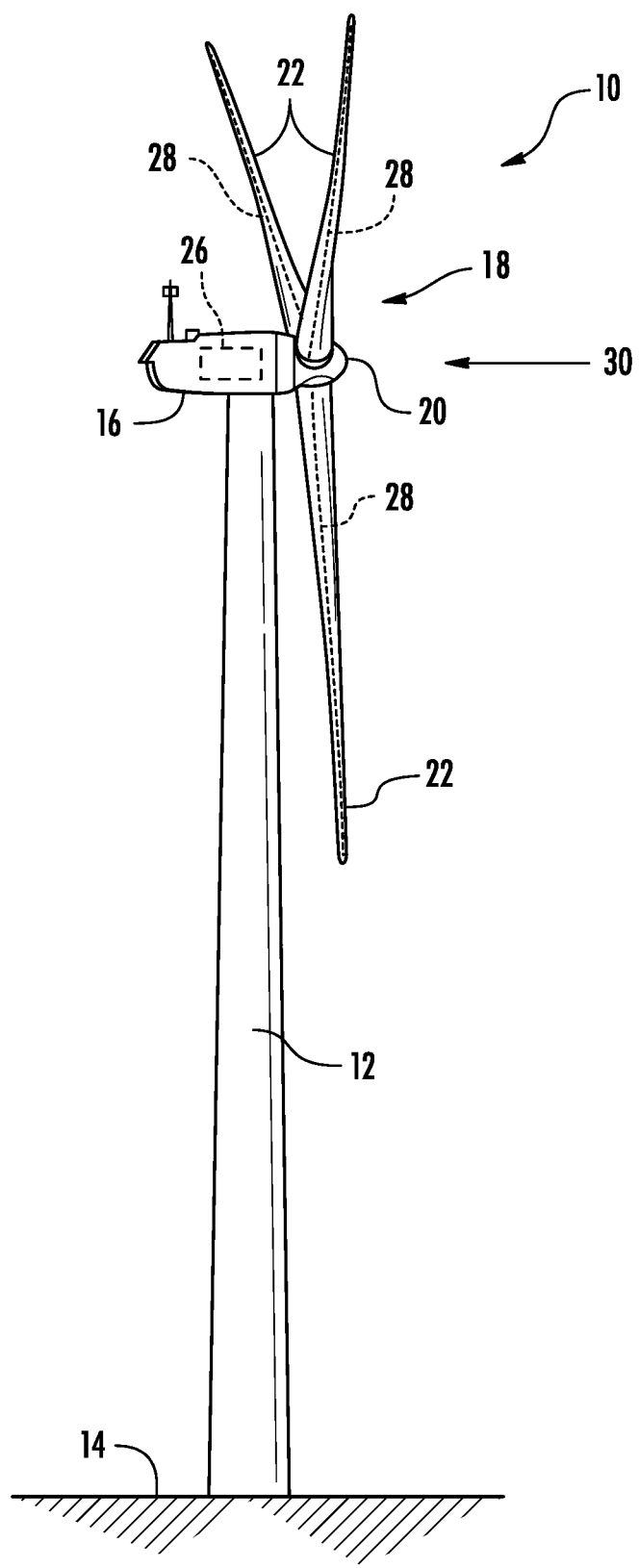
FIG. 4 illustrates a perspective view of one embodiment of a wind turbine according to the present disclosure.

Referring now to the drawings, FIG. 4 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 5) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 5:
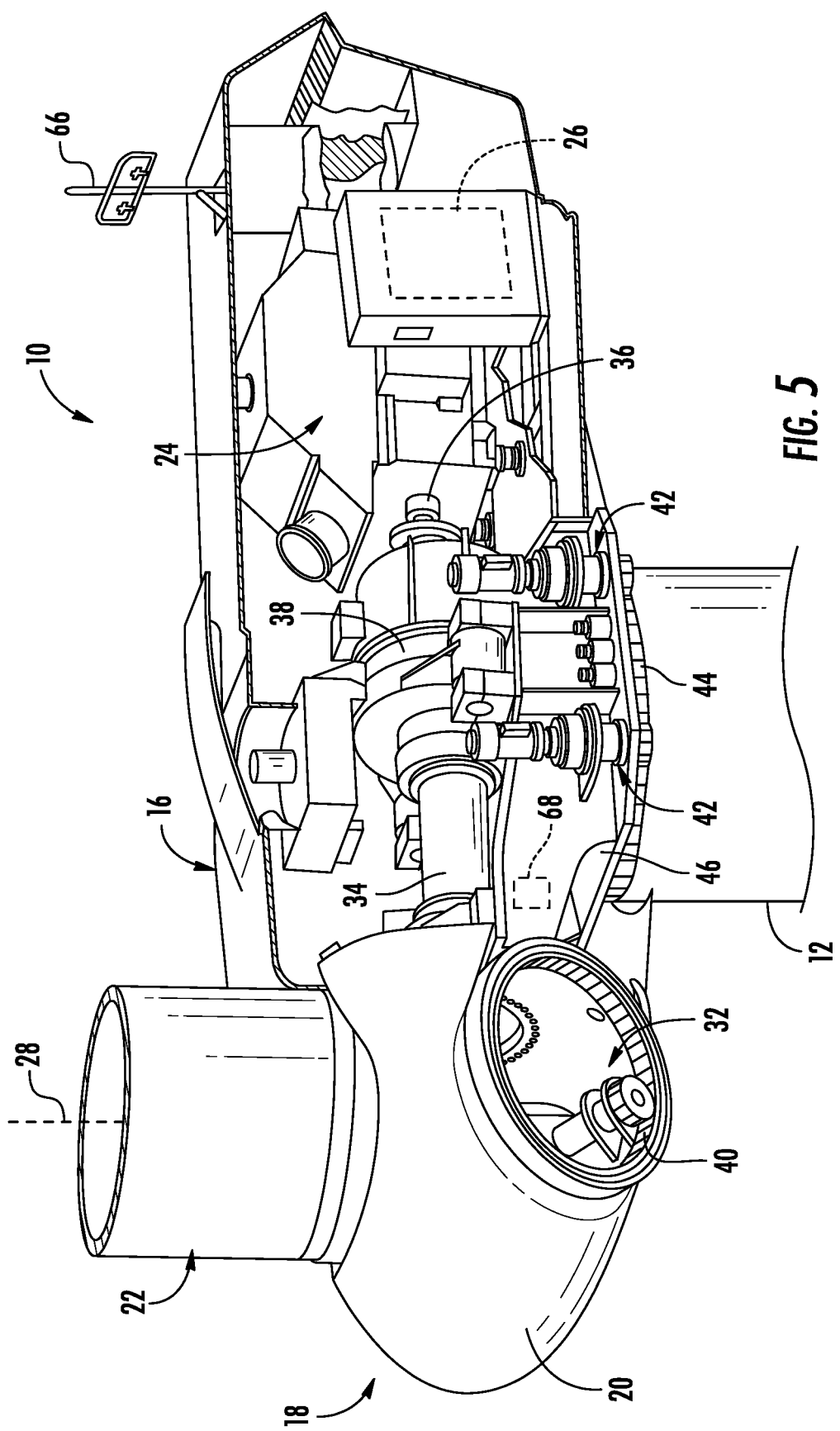
FIG. 5 illustrates a simplified, internal view of one embodiment of a nacelle according to the present disclosure.

Referring now to FIG. 5, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also include one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 6:
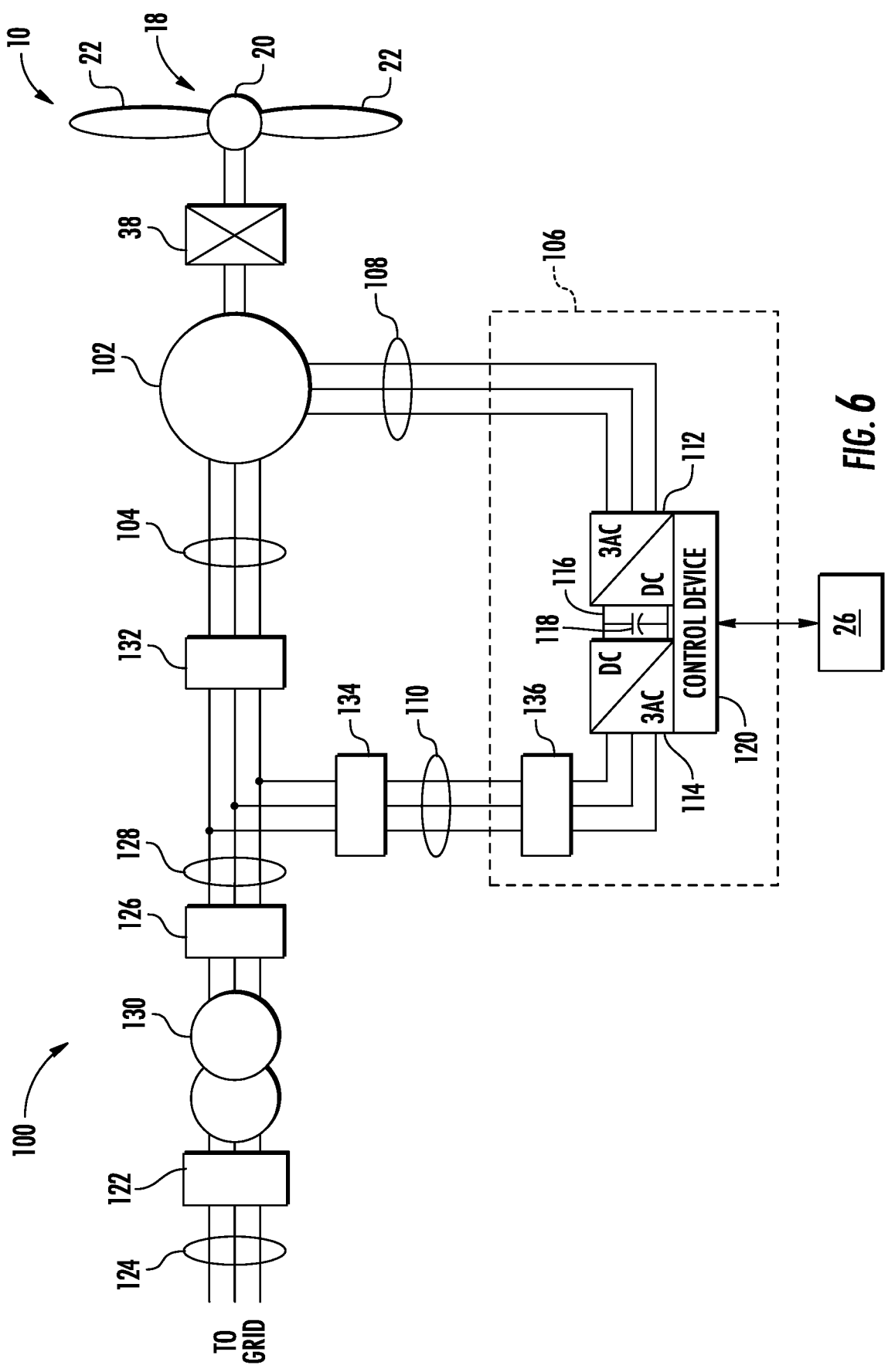
FIG. 6 illustrates a schematic view of one embodiment of a wind turbine electrical power system suitable for use with the wind turbine shown in FIG. 1.

Referring now to FIG. 6, a schematic diagram of one embodiment of a wind turbine power system 100 is illustrated in accordance with aspects of the present disclosure. Although the present disclosure will generally be described herein with reference to the wind turbine 10 shown in FIG. 4, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 6 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g. three-phase power) from a stator of the DFIG 102, and the rotor bus 108 may provide an output multiphase power (e.g. three-phase power) from a rotor of the DFIG 102. The power converter 106 may also include a rotor side converter (RSC) 112 and a line side converter (LSC) 114. The DFIG 102 is coupled via the rotor bus 108 to the RSC 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the RSC 112 and/or the LSC 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g. three-phase) alternating current (AC) power is provided to the power converter 106. The RSC 112 converts the AC power provided from the rotor bus 108 into direct current (DC) power and provides the DC power to the DC link 116. As is generally understood, switching elements (e.g. IGBTs) used in the bridge circuits of the RSC 112 may be modulated to convert the AC power provided from the rotor bus 108 into DC power suitable for the DC link 116.

In addition, the LSC 114 converts the DC power on the DC link 116 into AC output power suitable for the electrical grid 124. In particular, switching elements (e.g. IGBTs) used in bridge circuits of the LSC 114 can be modulated to convert the DC power on the DC link 116 into AC power on the line side bus 110. The AC power from the power converter 106 can be combined with the power from the stator of DFIG 102 to provide multi-phase power (e.g. three-phase power) having a frequency maintained substantially at the frequency of the electrical grid 124 (e.g. 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g. three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 7:
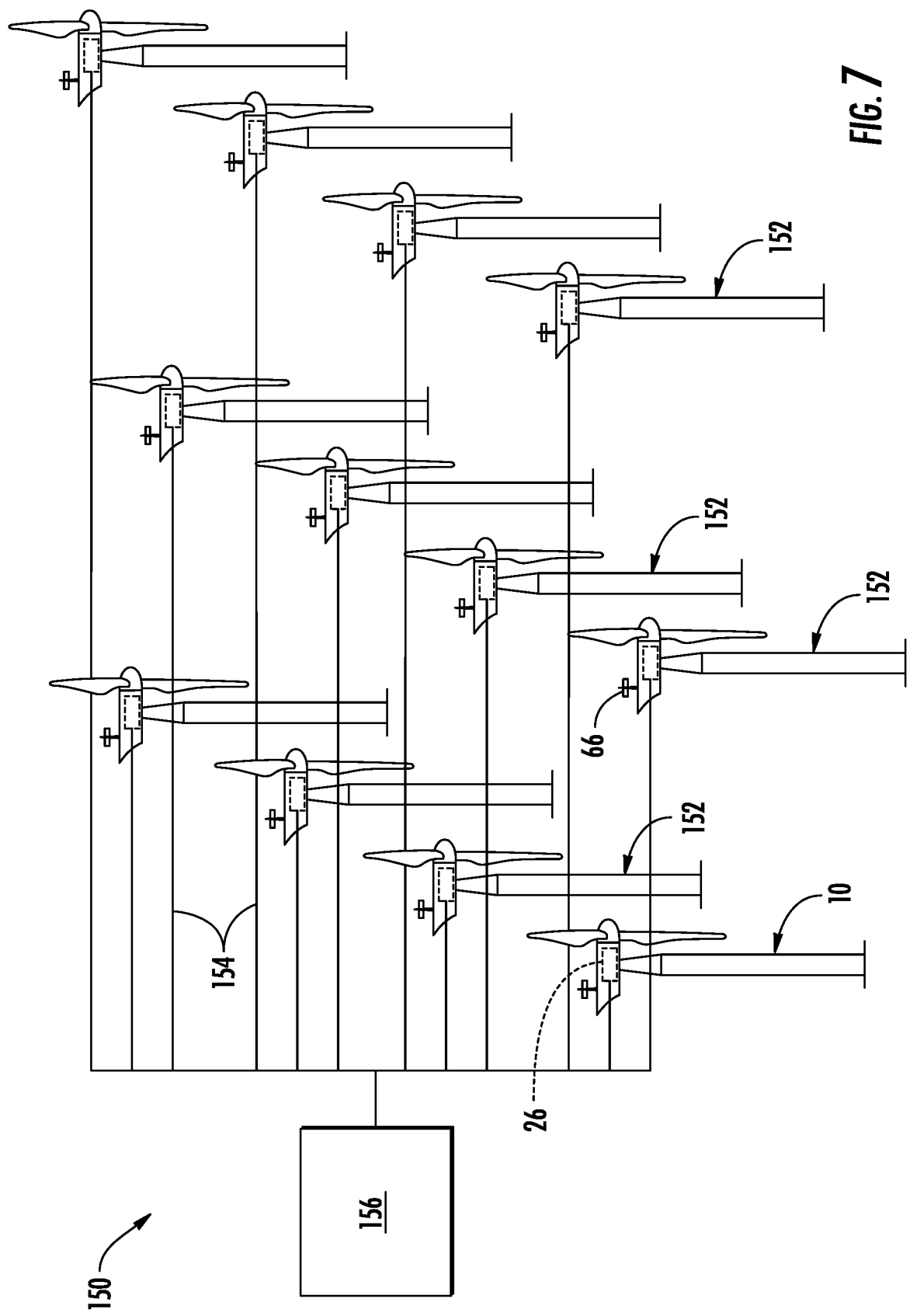
FIG. 7 illustrates a schematic view of one embodiment of a wind farm having a plurality of wind turbines according to the present disclosure.

Referring now to FIG. 7, the wind turbine power system 100 described herein may be part of a wind farm 50. As shown, the wind farm 50 may include a plurality of wind turbines 52, including the wind turbine 10 described above, and an overall farm-level controller 56. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the turbine controllers of the plurality of wind turbines 52 are communicatively coupled to the farm-level controller 56, e.g. through a wired connection, such as by connecting the turbine controller 26 through suitable communicative links 54 (e.g., a suitable cable). Alternatively, the turbine controllers may be communicatively coupled to the farm-level controller 56 through a wireless connection, such as by using any suitable wireless communications protocol known in the art. In further embodiments, the farm-level controller 56 is configured to send and receive control signals to and from the various wind turbines 52, such as for example, distributing real and/or reactive power demands across the wind turbines 52 of the wind farm 50.

Figure 8:
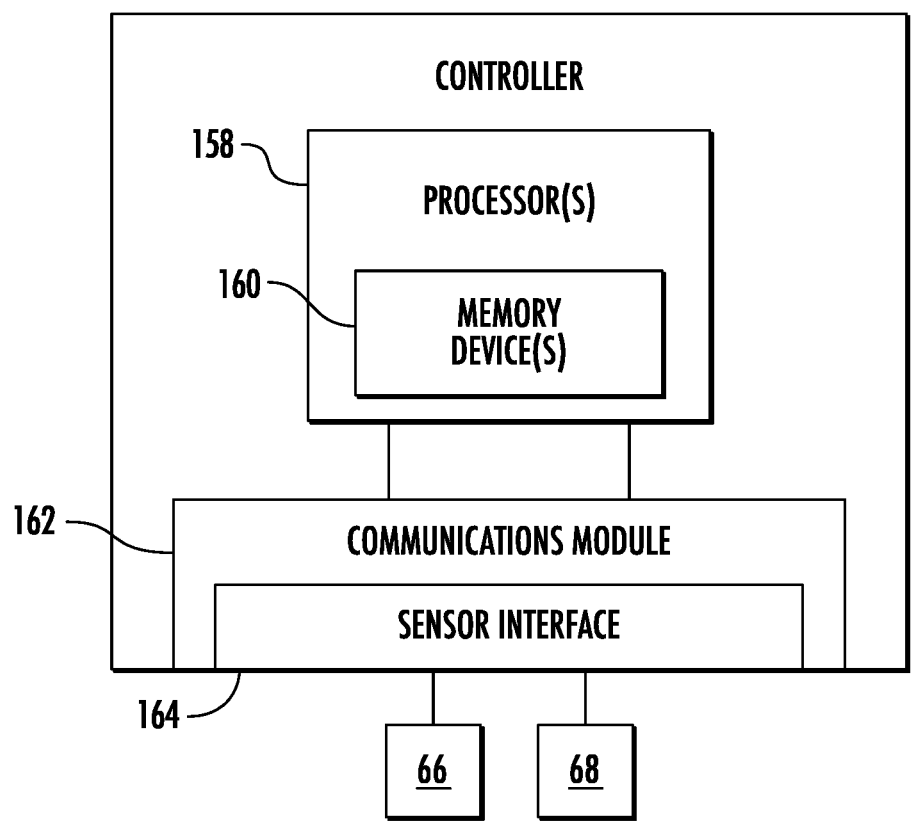
FIG. 8 illustrates a block diagram of one embodiment of a controller according to the present disclosure.

Referring now to FIG. 8, a block diagram of one embodiment of suitable components that may be included within the controller (such as any one of the converter controller 120, the turbine controller 26, and/or the farm-level controller 56 described herein) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

Figure 9:
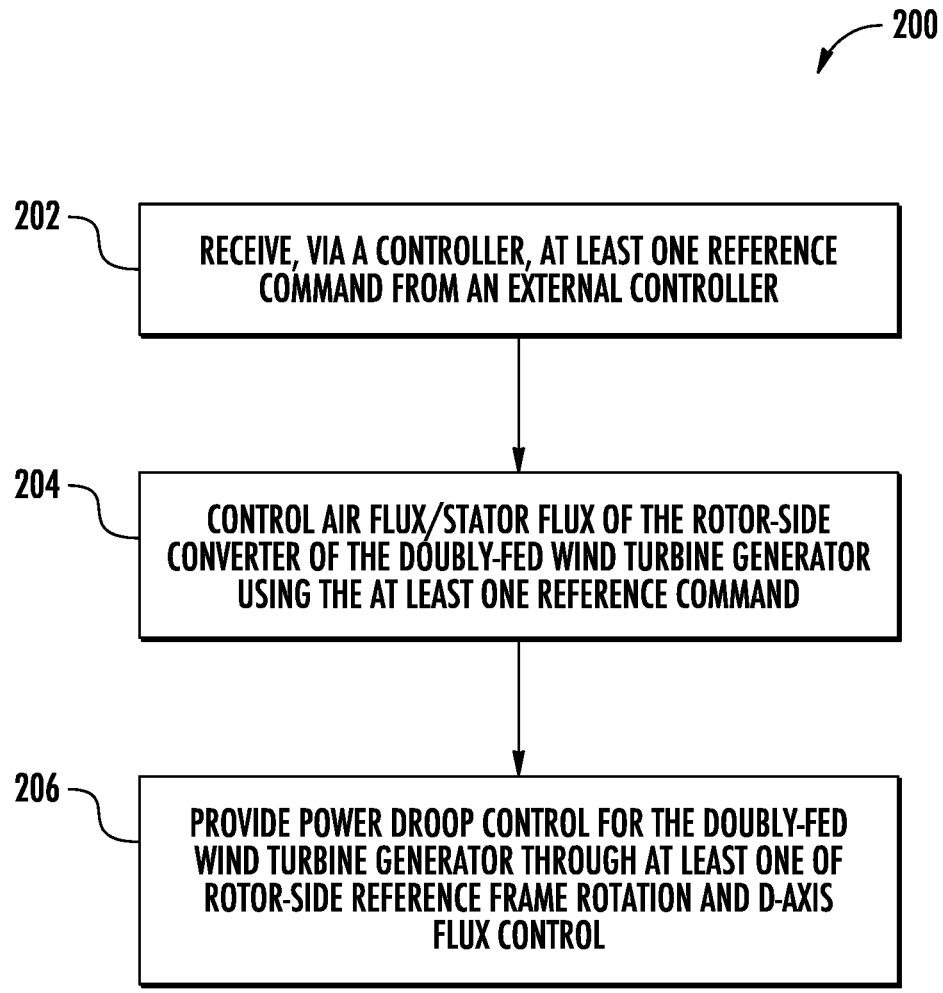
FIG. 9 illustrates a flow diagram of one embodiment of method for operating an asynchronous doubly-fed wind turbine generator connected to a power grid in a grid-forming mode to emulate a virtual synchronous machine according to the present disclosure.
Figure 10:
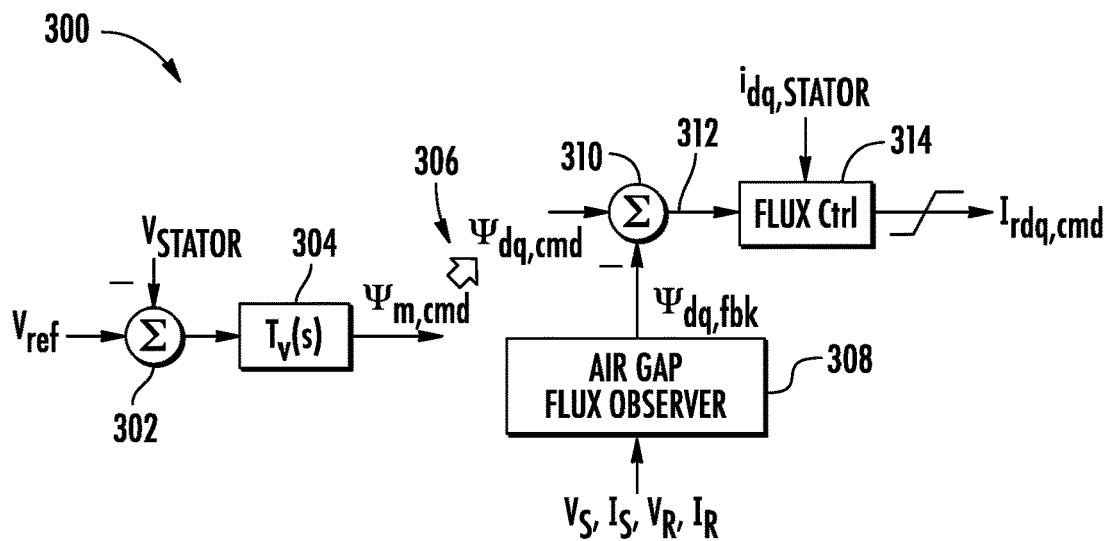
FIG. 10 illustrates a schematic diagram of one embodiment of a system for providing flux control for voltage and/or reactive power regulation of an asynchronous doubly-fed wind turbine generator connected to a power grid in a grid-forming mode to emulate a virtual synchronous machine according to the present disclosure.

Referring now to FIGS. 9-13, various illustrations of a method 200 and system 300 for operating an asynchronous doubly-fed wind turbine generator connected to a power grid in a grid-forming mode to emulate a virtual synchronous machine are provided. In particular, as shown in FIG. 9, a flow diagram of one embodiment of the method 200 for operating an asynchronous doubly-fed wind turbine generator connected to a power grid in a grid-forming mode to emulate a virtual synchronous machine is provided. In general, the method 200 is described herein with reference to the wind turbine power system 100 of FIGS. 4-8. However, it should be appreciated that the disclosed method 200 may be implemented with any other suitable power generation systems having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes receiving, via a controller of the system 300, at least one reference command from an external controller. As an initial matter, in particular embodiments, the controller described herein may include the turbine controller 26 or the converter controller 120 of the wind turbine power system 100. For example, in an embodiment, the reference command may include a power reference command and/or a voltage reference command from the external controller. For example, in particular embodiments, the power reference command may include an active power reference command or a reactive power reference command.

As shown at (204), the method 200 includes controlling air flux/stator flux of the DFIG 102 using the reference command(s). Controlling the rotor flux of the DFIG 102 can be better understood with respect to FIG. 10. For example, as shown at 302 of the illustrated embodiment, the controller may receive the voltage reference command $V_{ref}$ from the external controller and/or a stator voltage $V_{stator}$ from a stator of the DFIG 102. Further, as shown at 304, the controller can then determine a magnetizing flux command $\Psi_{m,cmd}$ using the voltage reference command $V_{ref}$ and the stator voltage $V_{stator}$. In such embodiments, the controller can then determine a rotor current command $I_{rdq-cmd}$ based, at least in part, on the magnetizing flux command $\Psi_{m,cmd}$. In particular embodiments, as shown at 306, the controller may determine the rotor current command $I_{rdq-cmd}$ by transforming the magnetizing flux command $\Psi_{m,cmd}$ into a d-q axis flux command $\Psi_{dq,cmd}$.

Figure 13:
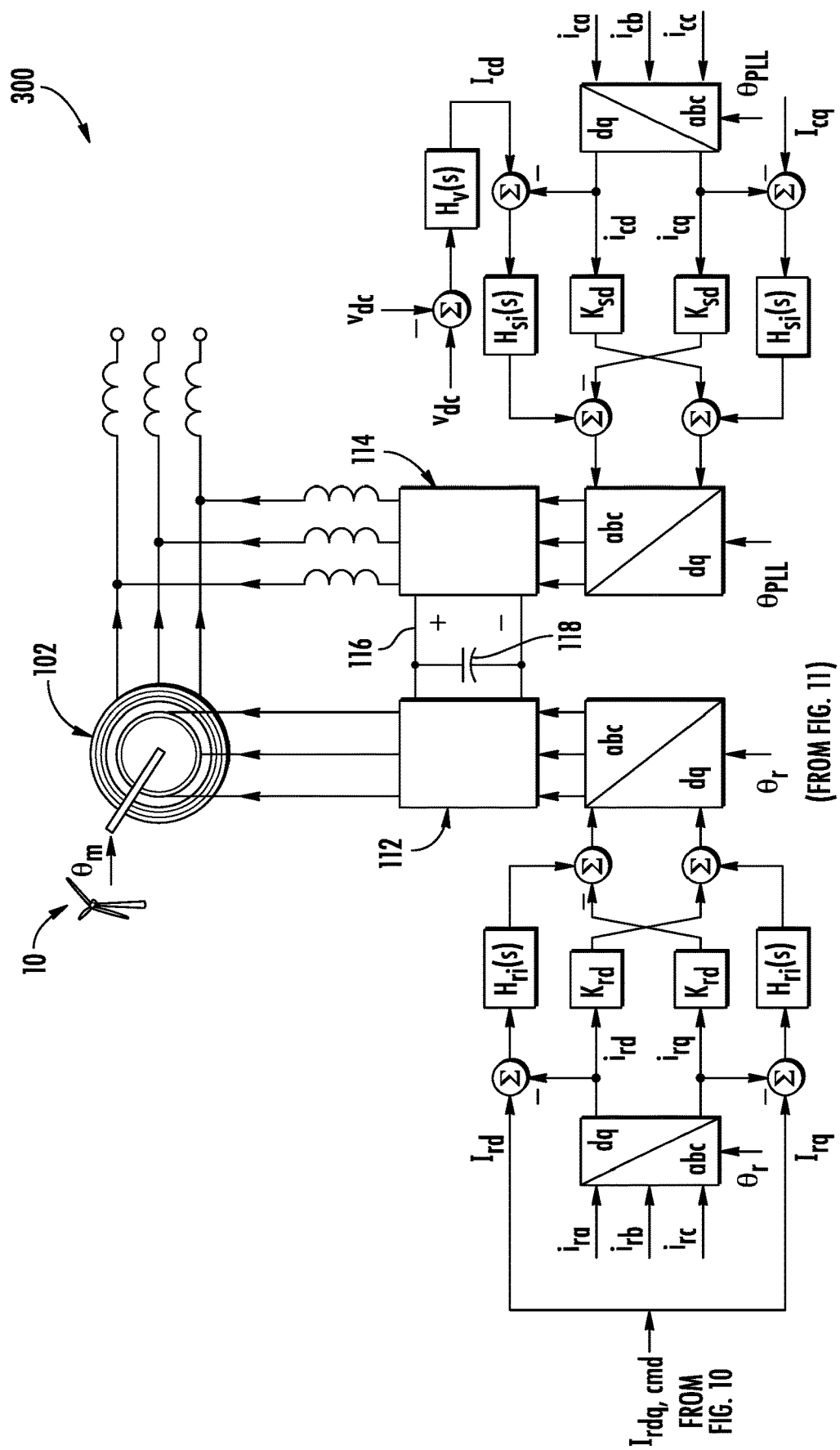
FIG. 13 illustrates a schematic diagram of one embodiment of method for operating an asynchronous doubly-fed wind turbine generator connected to a power grid in a grid-forming mode to emulate a virtual synchronous machine according to the present disclosure.

Moreover, the controller may include an air gap flux observer module 308 for determining an air gap flux feedback signal $\Psi_{dq,fbk}$ using, for example, at least one of stator current Is, the stator voltage $V_S$, rotor current $I_R$, or rotor voltage $V_R$. Accordingly, as shown, the controller is configured to determine the rotor current command $I_{rdq-cmd}$ based on a function of the d-q axis flux command $\Psi_{dq,cmd}$ and the air gap flux feedback signal $\Psi_{dq,fbk}$. In particular, as shown at 310, the difference between d-q axis flux command $\Psi_{dq,cmd}$ and the air gap flux feedback signal $\Psi_{dq,fbk}$ may be calculated. Moreover, as shown, a flux control module 314 is configured to receive the output 312 from the summation as well as a dq-axis stator current $i_{dq,stator}$. Thus, the output of the flux control module 314 corresponds to the rotor current command $I_{rdq-cmd}$ that can be used to control the RSC 112, as shown in FIG. 13.

Referring back to FIG. 9, as shown at (206), the method 200 also includes providing power droop control for the DFIG 102 through at least one of rotor-side reference frame rotation and d-axis flux control. For example, in certain embodiments, providing the power droop control for the DFIG 102 through at least one of rotor-side reference frame rotation and d-axis flux control may include providing active power-frequency droop control for the DFIG 102 through rotor-side reference frame rotation and providing reactive power-voltage droop control for the DFIG 102 through d-axis flux control.

Figure 11:
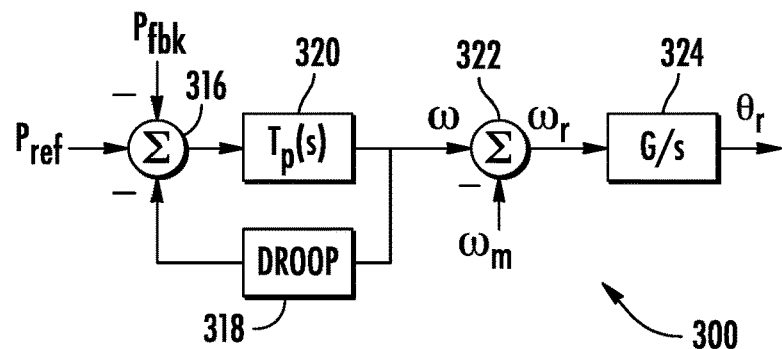
FIG. 11 illustrates a schematic diagram of one embodiment of a system for active power-frequency droop control through rotor-side reference frame shifting of an asynchronous doubly-fed wind turbine generator connected to a power grid in a grid-forming mode to emulate a virtual synchronous machine according to the present disclosure.

In particular embodiments, providing active power-frequency droop control for the DFIG 102 through rotor-side reference frame rotation can be better understood with respect to FIG. 11. For example, as shown in the illustrated embodiment, the controller may receive the active power reference command $P_{ref}$ from the external controller and an active power feedback signal $P_{fbk}$. In addition, as shown, the controller may include a droop characteristic function 318 relating active power values to angular frequency values. Thus, in such embodiments, as shown at 316, the controller can compare the active power reference command $P_{ref}$, the active power feedback signal $P_{fbk}$, and an output signal from the droop characteristic function 318. Further, in certain embodiments, as shown at 320, the controller can determine an angular frequency ω of the DFIG 102 as a function of the active power reference command $P_{ref}$ and the active power feedback signal $P_{fbk}$, and/or the droop characteristic function 318. Moreover, as shown at 322, the controller can determine a rotor frequency $ω_r$ using the angular frequency ω and a magnetizing angular frequency $ω_m$ of the DFIG 102. Furthermore, as shown, the controller can then determine a phase angle $θ_r$ for a rotor-side d-q reference frame as a function of the rotor frequency $ω_r$. In particular embodiments, as shown at 324, the controller may determine the phase angle $θ_r$ for the rotor-side d-q reference frame by integrating the rotor frequency $ω_r$. Thus, as shown in FIG. 13, the controller is configured to shift the rotor-side d-q reference frame of the DFIG 102 by the phase angle $θ_r$ to achieve the active power-frequency droop control of the DFIG 102.

Figure 12:
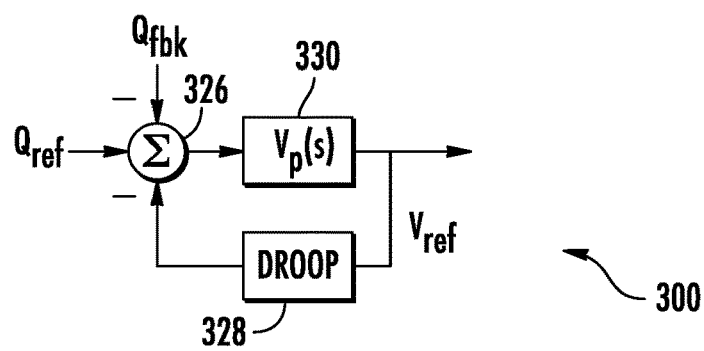
FIG. 12 illustrates a schematic diagram of one embodiment of a system for reactive power-voltage droop control through d-axis flux control of an asynchronous doubly-fed wind turbine generator connected to a power grid in a grid-forming mode to emulate a virtual synchronous machine according to the present disclosure.

Similarly, as shown in FIG. 12 and as mentioned, the controller is configured to provide reactive power-voltage droop control for the DFIG 102 through d-axis flux control. For example, as shown in the illustrated embodiment, the controller may receive the reactive power reference command $Q_{ref}$ from the external controller and a reactive power feedback signal $Q_{fbk}$. In addition, as shown, the controller may include a droop characteristic function 328 relating reactive power values to voltage values. Thus, in such embodiments, as shown at 326, the controller can compare the reactive power reference command $Q_{ref}$, the reactive power feedback signal $Q_{fbk}$, and an output signal from the droop characteristic function 328. Further, in certain embodiments, as shown, the controller can determine a stator terminal voltage reference $V_{ref}$ as a function of the reactive power reference command $Q_{ref}$ and the reactive power feedback signal $Q_{fbk}$, and/or the droop characteristic function 328. Thus, as shown in FIG. 13, the controller is configured to control d-axis flux of the DFIG 102 using the voltage command $V_{ref}$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an asynchronous doubly-fed wind turbine generator connected to a power grid in a grid-forming mode to emulate a virtual synchronous machine, the doubly-fed wind turbine generator comprising a line-side converter coupled to a rotor-side converter via a direct current (DC) link, the method comprising:
   receiving, via a controller, at least one reference command from an external controller;
   controlling rotor flux of the doubly-fed wind turbine generator using the at least one reference command; and
   providing power droop control for the doubly-fed wind turbine generator through at least one of rotor-side reference frame rotation and d-axis flux control.

2. The method of claim 1, wherein the at least one reference command comprises a power reference command and a voltage reference command from the external controller, the power reference command comprising one of an active power reference command or a reactive power reference command.

3. The method of claim 2, wherein controlling the rotor flux of the doubly-fed wind turbine generator using the at least one reference command further comprises:
   receiving the voltage reference command from the external controller;
   receiving a stator voltage from a stator of the doubly-fed wind turbine generator;
   determining a flux command using the voltage reference command and the stator voltage; and
   determining a rotor current command based on the flux command.

4. The method of claim 3, wherein determining the rotor current command based on the flux command further comprises:
   determining an air gap flux feedback signal using at least one of stator current, the stator voltage, rotor current, or rotor voltage; and
   determining the rotor current command based on the flux command and the air gap flux feedback signal.

5. The method of claim 4, further comprising determining the rotor current command based on the flux command, the air gap flux feedback signal, and the stator current.

6. The method of claim 2, wherein providing the power droop control for the doubly-fed wind turbine generator through at least one of rotor-side reference frame rotation and d-axis flux control further comprises:
   providing active power-frequency droop control for the doubly-fed wind turbine generator through rotor-side reference frame rotation; and
   providing reactive power-voltage droop control for the doubly-fed wind turbine generator through d-axis flux control.

7. The method of claim 6, wherein providing the active power-frequency droop control for the doubly-fed wind turbine generator through the rotor-side reference frame rotation further comprises:
   receiving the active power reference command from the external controller;
   receiving an active power feedback signal;
   determining an angular frequency of the doubly-fed wind turbine generator as a function of the active power reference command and the active power feedback signal;
   determining a rotor frequency using the angular frequency and a magnetizing angular frequency of the doubly-fed wind turbine generator;
   determining a phase angle for a rotor-side d-q reference frame as a function of the rotor frequency; and
   shifting the rotor-side d-q reference frame of the doubly-fed wind turbine generator by the phase angle to achieve the active power-frequency droop control of the doubly-fed wind turbine generator.

8. The method of claim 7, wherein determining the phase angle for the rotor-side d-q reference frame as a function of the rotor frequency further comprises:
   integrating the rotor frequency to determine the phase angle.

9. The method of claim 7, wherein providing the power droop control for the doubly-fed wind turbine generator through at least one of rotor-side reference frame rotation and d-axis flux control further comprises:
   providing a droop characteristic function relating active power values to angular frequency values; and
   determining the angular frequency of the doubly-fed wind turbine generator as a function of the power reference command, the power feedback signal, and the droop characteristic function.

10. The method of claim 9, wherein providing the reactive power-voltage droop control for the doubly-fed wind turbine generator through the d-axis flux control further comprises:
    receiving the reactive power reference command from the external controller;
    receiving a reactive power feedback signal;
    determining a voltage command for the doubly-fed wind turbine generator as a function of one or more of the reactive power reference command, the reactive power feedback signal, and a magnetizing voltage of the doubly-fed wind turbine generator; and
    controlling d-axis flux of the doubly-fed wind turbine generator using the voltage command.

11. The method of claim 10, further comprising integrating the voltage command for the doubly-fed wind turbine generator.

12. The method of claim 10, further comprising:
    providing a droop characteristic function relating reactive power values to voltage values; and
    determining the voltage command of the doubly-fed wind turbine generator as a function of the reactive power reference command, the reactive power feedback signal, and the droop characteristic function.

13. The method of claim 1, wherein the controller comprises at least one of a turbine controller or a converter controller of the wind turbine power system.

14. A system for operating an asynchronous doubly-fed wind turbine generator connected to a power grid in a grid-forming mode to emulate a virtual synchronous machine, the doubly-fed wind turbine generator comprising a line-side converter coupled to a rotor-side converter via a direct current (DC) link, the system comprising:
    a controller comprising at least one processor configured to perform a plurality of operations, the plurality of operations comprising:
    receiving at least one reference command from an external controller;
    controlling rotor flux of the doubly-fed wind turbine generator using the at least one reference command; and
    providing power droop control for the doubly-fed wind turbine generator through at least one of rotor-side reference frame rotation and d-axis flux control.

15. The system of claim 14, wherein the at least one reference command comprises a power reference command and a voltage reference command from the external controller, the power reference command comprising one of an active power reference command or a reactive power reference command.

16. The system of claim 15, wherein controlling the rotor flux of the doubly-fed wind turbine generator using the at least one reference command further comprises:
   receiving the voltage reference command from the external controller;
   receiving a stator voltage from a stator of the doubly-fed wind turbine generator;
   determining a flux command using the voltage reference command and the stator voltage; and
   determining a rotor current command based on the flux command.

17. The system of claim 16, wherein determining the rotor current command based on the flux command further comprises:
   determining an air gap flux feedback signal using at least one of stator current, the stator voltage, rotor current, or rotor voltage; and
   determining the rotor current command based on the flux command, the air gap flux feedback signal, and the stator current.

18. The system of claim 14, wherein providing the power droop control for the doubly-fed wind turbine generator through at least one of rotor-side reference frame rotation and d-axis flux control further comprises:
   providing active power-frequency droop control for the doubly-fed wind turbine generator through rotor-side reference frame rotation; and
   providing reactive power-voltage droop control for the doubly-fed wind turbine generator through d-axis flux control.

19. The system of claim 18, wherein providing the power droop control for the doubly-fed wind turbine generator through at least one of rotor-side reference frame rotation and d-axis flux control further comprises:
   receiving the power reference command from the external controller;
   receiving a power feedback signal;
   providing a droop characteristic function relating power values to angular frequency values or voltage values;
   determining a rotor signal as a function of the power reference command, the power feedback signal, and the droop characteristic function;
   determining a rotor command using the rotor signal and a magnetizing signal of the doubly-fed wind turbine generator;
   controlling the doubly-fed wind turbine generator using the rotor command.

* * * * *